US011787110B2

(12) United States Patent
Olubummo et al.

(10) Patent No.: US 11,787,110 B2
(45) Date of Patent: Oct. 17, 2023

(54) THREE-DIMENSIONAL PRINTING WITH EPOXY AND AMINE COMPOUNDS

(71) Applicant: Hewlett-Packard Development Company, L.P., Spring, TX (US)

(72) Inventors: Adekunle Olubummo, Palo Alto, CA (US); Kyle Wycoff, Palo Alto, CA (US); Aja Hartman, Palo Alto, CA (US); Lihua Zhao, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/113,024

(22) Filed: Feb. 22, 2023

(65) Prior Publication Data

US 2023/0203306 A1 Jun. 29, 2023

Related U.S. Application Data

(62) Division of application No. 17/052,603, filed as application No. PCT/US2019/022756 on Mar. 18, 2019, now Pat. No. 11,591,494.

(51) Int. Cl.
| | |
|---|---|
| *B29C 64/165* | (2017.01) |
| *C08L 77/02* | (2006.01) |
| *B33Y 10/00* | (2015.01) |
| *B33Y 70/00* | (2020.01) |
| *C08K 3/04* | (2006.01) |
| *C08K 5/00* | (2006.01) |
| *C09D 177/02* | (2006.01) |
| *C09D 7/63* | (2018.01) |
| *B29K 63/00* | (2006.01) |
| *B29K 101/12* | (2006.01) |
| *B33Y 80/00* | (2015.01) |
| *B29K 105/16* | (2006.01) |
| *B22F 1/054* | (2022.01) |

(52) U.S. Cl.
CPC ............ *C08L 77/02* (2013.01); *B29C 64/165* (2017.08); *B33Y 10/00* (2014.12); *B33Y 70/00* (2014.12); *C08K 3/04* (2013.01); *C08K 5/0091* (2013.01); *C09D 7/63* (2018.01); *C09D 177/02* (2013.01); *B22F 1/054* (2022.01); *B29K 2063/00* (2013.01); *B29K 2101/12* (2013.01); *B29K 2105/16* (2013.01); *B33Y 80/00* (2014.12)

(58) Field of Classification Search
CPC ....... C09D 163/00; C08L 63/00; C08G 59/50; B29C 64/165; B33Y 70/00; B33Y 10/00; C08K 3/04; C08K 3/346; C08K 5/0041
See application file for complete search history.

(56) References Cited

U.S. PATENT DOCUMENTS

| | | |
|---|---|---|
| 2007/0241482 A1 | 10/2007 | Giller et al. |
| 2008/0122141 A1 | 5/2008 | Bedal et al. |
| 2016/0198576 A1 | 7/2016 | Lewis et al. |
| 2016/0347729 A1 | 12/2016 | Lunzer et al. |
| 2017/0031059 A1 | 2/2017 | Valeri et al. |
| 2017/0239723 A1 | 8/2017 | Hoyt et al. |
| 2018/0093925 A1 | 4/2018 | Diekmann et al. |
| 2019/0030799 A1 | 1/2019 | Chen et al. |
| 2019/0240901 A1 | 8/2019 | Jansen et al. |

FOREIGN PATENT DOCUMENTS

| | | | |
|---|---|---|---|
| CN | 108148249 | A | 6/2018 |
| CN | 109438746 | A | 3/2019 |
| WO | 2015/100243 | A1 | 7/2015 |
| WO | 2016/195974 | A1 | 12/2016 |
| WO | 2017/184135 | A1 | 10/2017 |
| WO | 2017/184136 | A1 | 10/2017 |
| WO | 2017184136 | | * 10/2017 |
| WO | 2017/196330 | A1 | 11/2017 |
| WO | 2018/194542 | A1 | 10/2018 |
| WO | 2019/005044 | A1 | 1/2019 |

OTHER PUBLICATIONS

Flavia Libonati; Grace X. Gu: Zhao Qin; Laura Vergani; Markus J. Buehle: "Bone-Inspired Materials by Design: Toughness Amplification Observed Using 3D Printing and Testing"; Advanced Engineering Materials 18(8); DOI: 10.1002/adem.201600143 (2016).

Theresa Swetl Y; Jurgen Stamp FL; Gero Kempf; Rainer-Michael Hucke: Marcus Willing; Marina Warkentin; "Bioinspired engineering polymers by voxel-based 3D-printing"; BioNanoMat 2016; 17 (3-4): 145-157, (2016).

Zian Jia; Yang Yu; Lifeng Wang; "Learning From Nature; Use Material Architecture To Break The Performance Tradeoffs"; Materials Design; vol. 168, 107650; (2019).

* cited by examiner

*Primary Examiner* — Kuo Liang Peng
(74) *Attorney, Agent, or Firm* — HP Inc. Patent Department

(57) ABSTRACT

The present disclosure is drawn to multi-fluid kits for three-dimensional to printing, three-dimensional printing kits, and methods of making three-dimensional printed articles. In one example, a multi-fluid kit for three-dimensional printing can include a fusing agent, a first reactive agent, and a second reactive agent. The fusing agent can include water and a radiation absorber. The first reactive agent can include a first liquid vehicle and an epoxy compound having multiple epoxide groups. The second reactive agent can include a second liquid vehicle and an amine compound having multiple amino groups.

11 Claims, 6 Drawing Sheets

THREE-DIMENSIONAL PRINTING WITH EPOXY AND AMINE COMPOUNDS

CROSS REFERENCE TO RELATED APPLICATIONS

This application is a divisional of U.S. application Ser. No. 17/052,603, filed Nov. 3, 2020, which itself is a National Stage Entry of International Application No. PCT/US2019/022756, filed Mar. 18, 2019, each of which is incorporated herein by reference in its entirety.

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Nevertheless, several commercial sectors such as aviation and the medical industry have benefitted from the ability to rapidly prototype and customize parts for customers.

DETAILED DESCRIPTION

Figure 1:
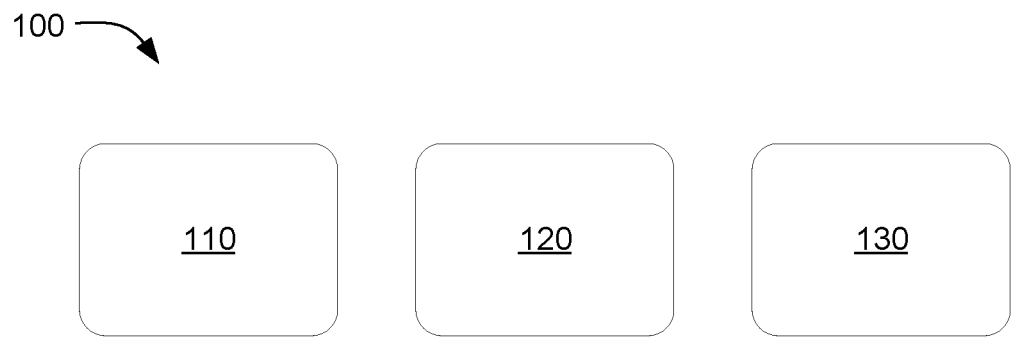
FIG. 1 is a schematic diagram of an example multi-fluid kit for three-dimensional printing in accordance with the present disclosure.

The present disclosure describes multi-fluid kits for three-dimensional printing, three-dimensional printing kits, and methods of making three-dimensional printed articles. In one example, a multi-fluid kit for three-dimensional printing can include a fusing agent including water and a radiation absorber; a first reactive agent including a first liquid vehicle and an epoxy compound having multiple epoxide groups; and a second reactive agent including a second liquid vehicle and an amine compound having multiple amino groups. In some examples, the epoxy compound can be 2-ethylhexyl glycidyl ether, phenol glycidyl ether, p-tert-butylphenyl glycidyl ether, dibromo phenyl glycidyl ether, lauryl alcohol glycidyl ether, resorcinol diglycidyl ether, neopentyl glycol diglycidyl ether, 1,6-hexanediol diglycidyl ether, glycerol polyglycidyl ether, trimethylolpropane polyglycidyl ether, pentaerythritol polyglycidyl ether, diglycerol polyglycidyl ether, polyglycerol polyglycidyl ether, sorbitol polyglycidyl ether, diglycidyl terephthalate, diglycidyl o-phthalate, N-glycidyl phthalimide, ethylene glycol diglycidyl ether, polyethylene glycol diglycidyl ether, tris(4-hydroxyphenyl) methane triglycidyl ether, or a combination thereof. In other examples, the amine compound can be aniline sulfonamide, tetraethylenepentamine, dipropylenediamine, diethylaminopropylamine, N-aminoethylpiperazine, bis(2-ethylhexyl)amine, methanediamine methylphenyl diamine, methylphenylenediamine, diaminodiphenyl sulfone, diethylenetriamine, triethylenetetramine, or a combination thereof. In some examples, the first reactive agent, the second reactive agent, or both can include water in an amount from about 10 wt % to about 60 wt %. In further examples, the first reactive agent, the second reactive agent, or both can include a humectant in an amount from about 20 wt % to about 60 wt %. In still further examples, the first reactive agent can include the epoxy compound in an amount from about 5 wt % to about 40 wt % and the second reactive agent can include the amine compound in an amount from about 5 wt % to about 30 wt %. In other examples, the radiation absorber can be a metal dithiolene complex, carbon black, a near-infrared absorbing dye, a near-infrared absorbing pigment, metal nanoparticles, a conjugated polymer, or a combination thereof.

The present disclosure also describes three-dimensional printing kits. In one example, a three-dimensional printing kit can include a powder bed material including polymer particles, a fusing agent, an epoxy compound having multiple epoxide groups, and an amine compound having multiple amino groups. The fusing agent can include water and a radiation absorber. The fusing agent can be selectively applied to the powder bed material. The epoxy compound can be present in: a) the powder bed material, b) the fusing agent, c) a first reactive agent, if present, including a liquid vehicle and the epoxy compound, or d) a combination thereof. The amine compound can be: a) an amino group-containing polymer included in the polymer particles of the powder bed material, b) a non-polymeric amine compound mixed with the polymer particles of the powder bed material, c) present in the fusing agent, d) present in a second reactive agent, if present, including a liquid vehicle and the amine compound, or d) a combination thereof. The amine compound and the epoxy compound are not present together in the powder bed material or the fusing agent. In a certain example, the polymer particles can have an average particle size from about 20 μm to about 100 μm and can include nylon 6, nylon 9, nylon 11, nylon 12, nylon 66, nylon 612, polyethylene, thermoplastic polyurethane, polypropylene, polyester, polycarbonate, polyether ketone, polyacrylate, polystyrene powder, wax, or a combination thereof. In another example, the epoxy compound can include ethylene glycol diglycidyl ether and tris(4-hydroxyphenyl) methane triglycidyl ether and the amine compound can include diaminodiphenyl sulfone. In yet another example, the radiation absorber can be a metal dithiolene complex. In a further example, the kit can include a detailing agent including a detailing compound to selectively apply to the powder bed material.

The present disclosure also describes methods of making three-dimensional printed articles. In one example, a method of making a three-dimensional printed article can include iteratively applying individual build material layers of polymer particles to a powder bed. A fusing agent can be selectively jetted, based on a three-dimensional object model, onto the individual build material layers. The fusing agent can include water and a radiation absorber. An epoxy compound can also be selectively introduced, based on the three-dimensional object model, into the individual build material layers if the epoxy compound is not already present in the individual build material layers. An amine compound can be selectively introduced, based on the three-dimensional object model, into the individual build material layers if the amine compound is not already present in the individual build material layers. The powder bed can be exposed to energy to selectively fuse the polymer particles in contact with the radiation absorber at individual build material layers. In another example, the epoxy compound can be introduced into the individual build material layers by selectively jetting a first reactive agent including a first liquid vehicle and the epoxy compound onto the individual build material layers. The amine compound can be introduced into the individual build material layers by selectively jetting a second reactive agent including a second liquid vehicle and the amine compound onto the individual build material layers. Exposing the powder bed to the energy can melt the polymer particles in contact with the radiation absorber. The first reactive agent and the second reactive agent can be jetted onto the molten polymer particles. In yet another example, the method can include post-curing the three-dimensional article at a temperature from about 100° C. to about 200° C. for a time from about 30 minutes to about 24 hours.

Multi-Fluid Kits for Three-Dimensional Printing

A variety of three-dimensional (3D) printing technologies use thermoplastic polymers as a raw material for building 3D objects. Some of these processes use thermoplastic polymers in the form of a filament or a powder. In many cases, the final printed object may have less than optimal mechanical properties, such as tensile strength, modulus, and others. Modifying the thermoplastic polymer build material is one potential way to enhance the mechanical properties of the finished printed object. Unfortunately, the choice of build material can be constrained by other properties that make the build material suitable for 3D printing, such as melting properties, fire retardancy, chemical resistance, and others. It can be difficult to maintain all of these properties while increasing the mechanical strength of the thermoplastic polymer.

The materials and methods described herein can provide stronger 3D printed parts by utilizing a thermoplastic polymer build material in conjunction with a crosslinking epoxy compound. In particular, the 3D printing processes described herein can use a thermoplastic polymer powder as the build material, and an epoxy compound can be added. The epoxy compound can react with amino groups that can be present in the thermoplastic polymer powder itself and/or present in a separate amine compound that is added during printing. The reaction can create a crosslinked polymer network throughout the 3D printed object that can strengthen the object compared to an object printed without the epoxy compound.

Generally, epoxy resins can be cured with compounds called curing agents or hardeners. An amine compound can be used as a curing agent or hardener to react with the epoxy compound. In some examples, the amine compound can include a primary amine compound that can include multiple amino groups per molecule. This can allow the amine compound to form multiple connections with the epoxy compound to form a crosslinked network. The materials and methods described herein can include an amine compound present in a fluid that is applied to a polymer powder during 3D printing, or the amine compound may be mixed with the polymer powder, or in some cases the polymer itself can include amino groups that can react with the epoxy compound to form crosslinks. Similarly, the epoxy compound can be present in a fluid that is applied to the polymer powder or the epoxy compound can be mixed in the polymer powder. Generally, the epoxy compound and the amine compound can be kept separate until the time of printing so that unwanted crosslinking does not occur.

With this description in mind, in some examples a multi-fluid kit for three-dimensional printing can include a fusing agent. The fusing agent can include water and a radiation absorber. The multi-fluid kit can also include a first reactive agent that includes a first liquid vehicle and an epoxy compound having multiple epoxide groups. The multi-fluid kit can also include a second reactive agent including a second liquid vehicle and an amine compound having multiple amino groups.

FIG. 1 shows an example multi-fluid kit 100 for three-dimensional printing in accordance with examples of the present disclosure. The multi-fluid kit includes a fusing agent 110, a first reactive agent 120, and a second reactive agent 130. As mentioned above, the fusing agent can include water and a radiation absorber. The first reactive agent can include a first liquid vehicle and an epoxy compound having multiple epoxide groups. The second reactive agent can include a second liquid vehicle and an amine compound having multiple amino groups.

In various examples, the multi-fluid kits described herein can be used in 3D printing processes that involve applying the fusing agent to a polymer powder build material and then heating the polymer powder to cause the polymer powder particles to melt together or otherwise fuse together to form a solid object. For example, the fusing agent can be applied to certain areas of a layer of polymer powder build material and then the build material can be irradiated with radiant energy. The radiation absorber in the fusing agent can absorb the radiant energy and generate heat to selectively melt the polymer particles where the fusing agent was applied. The first and second reactive agents can also be applied to the polymer powder, either before or after melting the polymer particles. In some examples heat from the irradiation can also promote the curing reaction between the epoxy compound and amine compound. Specific examples of methods of 3D printing are described in more detail below.

Fusing Agents

The multi-fluid kits for three-dimensional printing described herein can include a fusing agent. The fusing agent can include a radiation absorber that can absorb radiant energy and convert the energy to heat. In certain examples, the fusing fluid can be used with a powder bed material in a particular 3D printing process. A thin layer of powder bed material can be formed, and then the fusing agent can be selectively applied to areas of the powder bed material that are desired to be consolidated to become part of the solid 3D printed object. The fusing agent can be applied, for example, by printing such as with a fluid jet printhead. Fluid jet printheads can jet the fusing fluid in a similar way to an inkjet printhead jetting ink. Accordingly, the fusing fluid can be applied with great precision to certain areas of the powder bed material that are desired to form a layer of the final 3D printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles so that the particles consolidate into a solid layer, while the powder bed material that was not printed with the fusing agent remains as a loose powder with separate particles.

In some examples, the amount of radiant energy applied, the amount of fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder.

Generally, the process of forming a single layer by applying fusing agent and irradiating the powder bed can be repeated with additional layers of fresh powder bed material to form additional layers of the 3D printed object, thereby building up the final object one layer at a time. In this process, the powder bed material surrounding the 3D printed object can act as a support material for the object. When the 3D printing is complete, the object can be removed from the powder bed and any loose powder on the object can be removed.

Accordingly, in some examples, the fusing agent can include a radiation absorber that is capable of absorbing electromagnetic radiation to produce heat. The radiation absorber can be colored or colorless. In various examples, the radiation absorber can be glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above about 250° C. In still further examples, the high boiling point co-solvent can be present in the fusing agent at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %

First Reactive Agents

Figure 2:
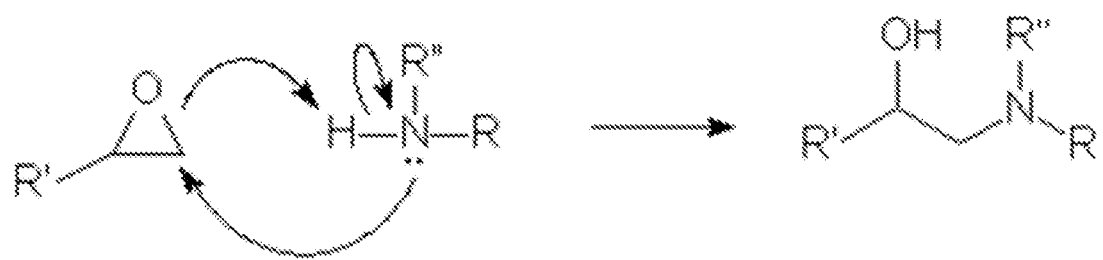
FIG. 2 is an example reaction mechanism of an epoxide group and an amine group in accordance with the present disclosure.
Figure 3:
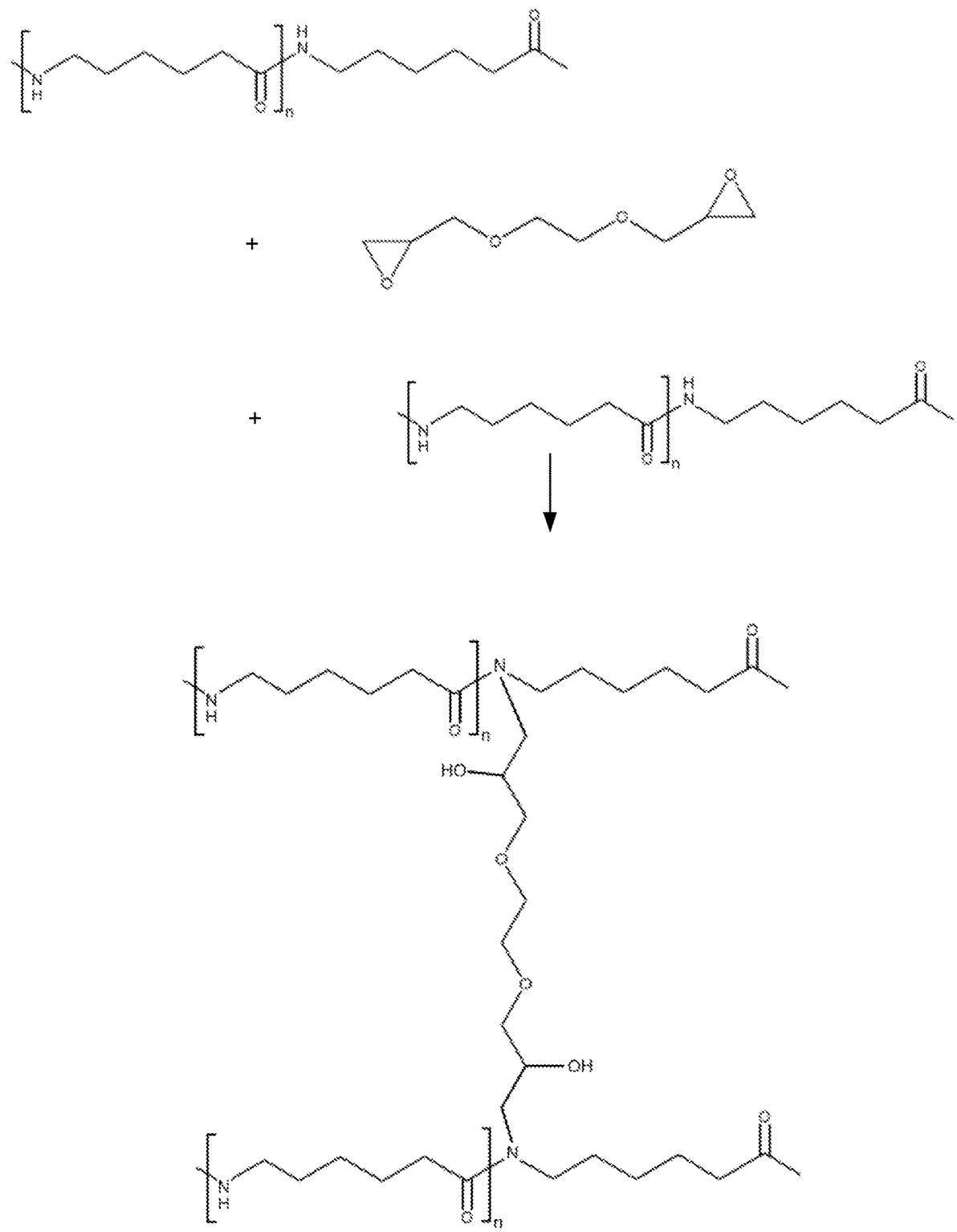
FIG. 3 is an example reaction mechanism of ethyleneglycol diglycidyl ether and nylon 6 polymer in accordance with the present disclosure.

The multi-fluid kits for three-dimensional printing described herein can also include a first reactive agent that that includes a first liquid vehicle and an epoxy compound having multiple epoxide groups. The epoxide group is a cyclic ether three-membered ring, which can be highly reactive with amino groups. Accordingly, when the epoxy compound comes in contact with an amine compound, the compounds can react at a high reaction rate. FIG. 2 shows an example reaction mechanism of an epoxy compound reacting with an amine compound. The epoxy compound that is included in the first reactive agent can have multiple epoxide groups so that when the multiple epoxide groups react with amino groups, a cross-linked network may form. FIG. 3 shows a reaction between ethyleneglycol diglycidyl ether and nylon 6 polymer. The ethyleneglycol diglycidyl ether is one example of an epoxy compound having multiple epoxide groups and the nylon 6 polymer is one example of an amine compound having multiple amino groups. As shown in the figure, two nylon 6 polymer chains can be crosslinked by reaction between the amino groups of the nylon 6 polymer chains with the epoxide groups at either end of the ethyleneglycol diglycidyl ether molecule. Additional molecules of ethyleneglycol diglycidyl ether can crosslink to additional nylon 6 polymer chains, forming a crosslinked network.

Non-limiting examples of epoxy compounds that can be used in the first reactive agent include 2-ethylhexyl glycidyl ether, phenol glycidyl ether, p-tert-butylphenyl glycidyl ether, dibromo phenyl glycidyl ether, lauryl alcohol glycidyl ether, resorcinol diglycidyl ether, neopentyl glycol diglycidyl ether, 1,6-hexanediol diglycidyl ether, glycerol polyglycidyl ether, trimethylolpropane polyglycidyl ether, pentaerythritol polyglycidyl ether, diglycerol polyglycidyl ether, polyglycerol polyglycidyl ether, sorbitol polyglycidyl ether, diglycidyl terephthalate, diglycidyl o-phthalate, N-glycidyl phthalimide, ethylene glycol diglycidyl ether, polyethylene glycol diglycidyl ether, tris(4-hydroxyphenyl) methane triglycidyl ether, and combinations thereof. In some examples, the epoxy compound can have exactly two epoxide groups. In other examples, the epoxy compound can have three or more epoxide groups. In further examples, a mixture of epoxy compounds can be used. For example, an epoxy compound having exactly two epoxide groups can be used together with an epoxy compound having three or more epoxide groups. In a particular example, the epoxy compound can include a combination of ethyleneglycol diglycidyl ether and triphenylolmethane triglycidyl ether.

In further examples, the first reactive agent can include the epoxy compound in an amount from about 5 wt % to about 40 wt %, or from about 10 wt % to about 30 wt %, or from about 15 wt % to about 25 wt %. In still further examples, the first reactive agent can include a humectant. In some examples, the humectant can be present in an amount from about 20 wt % to about 60 wt %, or from about 30 wt % to about 50 wt %, or from about 35 wt % to about 45 wt %. Non-limiting examples of humectants can include diethylene glycol butyl ether, 2-pyrrolidone, polyethylene glycol, N-methyl 2-pyrrolidone, hydroxy ethyl 2-pyrrolidone, and combinations thereof.

The first reactive agent can also include a liquid vehicle. In some examples, the liquid vehicle can be suitable for fluid jetting using a fluid jet printhead. The first reactive agent can be applied to the powder bed in the same way as the fusing agent described above. The liquid vehicle of the first reactive agent can include any of the ingredients and additives described above with respect to the fusing agent, such as an evaporating liquid for forming bubbles, dispersants, solvents, co-solvents, surfactants, biocides, and so on. In some examples, the first reactive agent can include an aqueous liquid vehicle. In certain examples, the first reactive agent can include water in an amount from about 10 wt % to about 60 wt %, or from about 20 wt % to about 50 wt %, or from about 25 wt % to about 45 wt %.

Second Reactive Agents

The multi-fluid kits for three-dimensional printing described herein can also include a second reactive agent that includes a second liquid vehicle and an amine compound having multiple amino groups. In some examples, the second reactive agent can be a jettable fluid that can be jetted onto the powder bed material in the same way as the fusing agent and the first reactive agent. When the second reactive agent and the first reactive agent are applied to the same area of the powder bed material, the amine compound from the second reactive agent can react with the epoxy compound from the first reactive agent. In certain examples, the fusing agent, first reactive agent, and second reactive agent can be applied to the same area of the powder bed material during printing.

In various examples, the amine compound in the second reactive agent can include aniline sulfonamide, tetraethylenepentamine, dipropylenediamine, diethylaminopropylamine, N-aminoethylpiperazine, bis(2-ethylhexyl)amine, methanediamine methylphenyl diamine, methylphenylenediamine, diaminodiphenyl sulfone, diethylenetriamine, triethylenetetramine, or a combination thereof. In a particular example, the amine compound can be diaminodiphenyl sulfone.

In further examples, the second reactive agent can include the amine compound in an amount from about 5 wt % to about 30 wt %, or from about 10 wt % to about 20 wt %. In still further examples, the second reactive agent can include a humectant. In some examples, the humectant can be present in an amount from about 20 wt % to about 60 wt %, or from about 30 wt % to about 55 wt %, or from about 35 wt % to about 50 wt %. The humectant in the second reactive agent can include any of the humectants mentioned above with respect to the first reactive agent.

The second reactive agent can also include a liquid vehicle. The liquid vehicle of the second reactive agent can include any of the ingredients and additives described above with respect to the fusing agent, such as dispersants, solvents, co-solvents, surfactants, biocides, and so on. In some examples, the first reactive agent can include an aqueous liquid vehicle. In certain examples, the second reactive agent can include water in an amount from about 10 wt % to about 60 wt %, or from about 20 wt % to about 50 wt %, or from about 25 wt % to about 45 wt %.

Detailing Agents

In other examples, the multi-fluid kit for three-dimensional printing can include a detailing agent that includes a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. Thus, the detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl Ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough energy from the light source to cause the powder to fuse. In certain examples, the detailing agent can include colorants such as dyes or pigments, but in small enough amounts that the colorants do not cause the powder printed with the detailing fluid to fuse when exposed to the light source.

Three-Dimensional Printing Kits

The present disclosure also extends to three-dimensional printing kits that can include combinations of the fusing agent and reactive agents described above with a polymer powder bed material. In a particular example, a three-dimensional printing kit can include a fusing agent as described above, a first reactive agent including an epoxy compound as described above, a second reactive agent including an amine compound as described above, and a powder bed material including polymer particles. When the first reactive agent and the second reactive agent are applied to the same area of the powder bed material, the epoxy compound and the amine compound can react to form a cross-linked network.

Although it can be convenient to include the first and second reactive agents to provide the epoxy and amine compounds, in some examples the epoxy and/or amine compound can be provided by mixing the compound into the fusing agent or the powder bed material itself. Thus, in certain examples a three-dimensional printing kit may not include a first reactive agent, or a second reactive agent, or both. Generally, the epoxy and amine compounds can be provided by any combination of the powder bed material, the fusing agent, and additional reactive agents, provided that the epoxy compound and amine compound remain separate until the time of printing a 3D object. Additionally, certain polymeric powder bed materials can include multiple amino groups as a part of the polymer itself. Several non-limiting examples of such polymers include polyamides such as nylon 6, nylon 9, nylon 11, nylon 12, nylon 66, and nylon 612. In such examples, an additional amine compound may not be included because the powder bed material already includes sufficient amino groups to react with the epoxy compound to form a crosslinked network. In further examples, an amino-group containing polymer powder bed material can be used with an additional amine compound to provide more cross-linking.

In summary, the three-dimensional printing kits can include an epoxy compound having multiple epoxide groups, where the epoxy compound is present in: a) the powder bed material (e.g., mixed with the powder); b) the fusing agent; c) a first reactive agent (as a separate fluid from the fusing agent); or d) a combination thereof. The three-dimensional printing kits can also include an amine compound having multiple amino groups, where the amine compound is: a) an amino group-containing polymer included in the polymer particles of the powder bed material; b) a non-polymeric amine compound mixed with the polymer particles of the powder bed material; c) present in the fusing agent; d) present in a second reactive agent; or e) a combination thereof. The epoxy compound and amine compound can remain separate until the time of printing. Therefore, the epoxy compound and the amine compound may not both be present together in either the powder bed material or the fusing agent.

Figure 4:
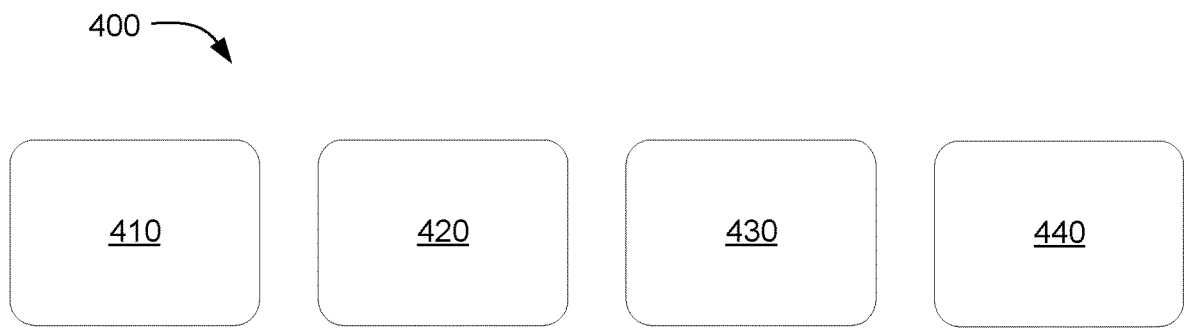
FIG. 4 is a schematic diagram of an example three-dimensional printing kit in accordance with the present disclosure.

FIG. 4 shows one example of a three-dimensional printing kit 400 in accordance with examples of the present disclosure. The three-dimensional printing kit includes a fusing agent 410, a first reactive agent including an epoxy compound 420, a second reactive agent including an amine compound 430, and a powder bed material 440. As mentioned above, the fusing agent can include a radiation absorber, the epoxy compound can include multiple epoxide groups, the amine compound can include multiple amino groups, and the powder bed material can include polymer particles. The fusing agent, first reactive agent, and second reactive agent can be selectively applied to the powder bed material to form a 3D printed object.

Figure 5:
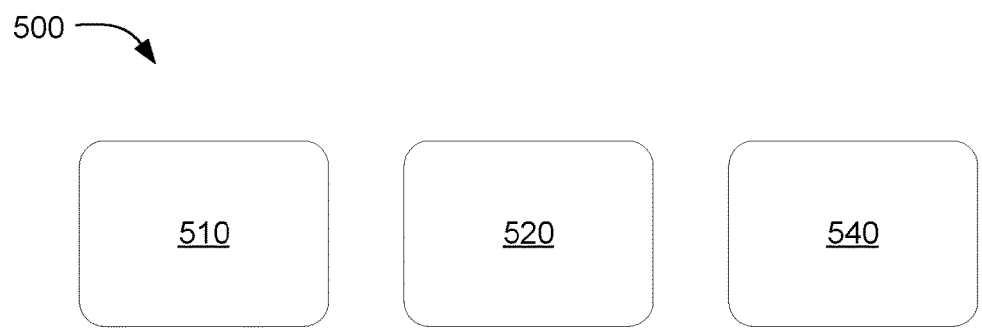
FIG. 5 is a schematic diagram of another example three-dimensional printing kit in accordance with the present disclosure.

FIG. 5 shows a different example three-dimensional printing kit 500 in accordance with examples of the present disclosure. In this example, the kit includes a fusing agent 510, a single additional reactive agent 520, and a powder bed material 540. The epoxy compound or the amine compound can be present in the fusing agent, the reactive agent, or the powder bed material. In a specific example, the reactive agent can include the epoxy compound and the fusing agent can include the amine compound. Conversely, in another example the fusing agent can include the epoxy compound and the reactive agent can include the amine compound. In another specific example, the powder bed material can include the amine compound and the reactive agent can include the epoxy compound. In yet another example, the powder bed material can include the epoxy compound and the reactive agent can include the amine compound.

Figure 6:
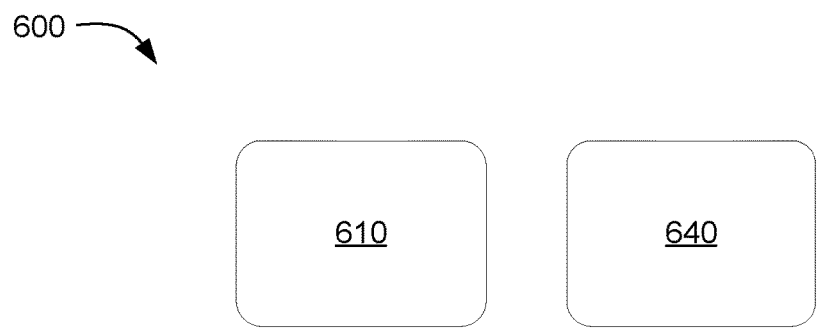
FIG. 6 is a schematic diagram of yet another example three-dimensional printing kit in accordance with the present disclosure.

FIG. 6 shows a particular example three-dimensional printing kit 600. This example includes a fusing agent 610 and a powder bed material 640. In this example, the amine compound can be present in the powder bed material and the epoxy compound can be present in the fusing agent. Conversely, in another specific example, the amine compound can be present in the fusing agent and the epoxy compound can be present in the powder bed material. Thus, in these examples, no additional reactive agent is used with the fusing agent In some examples, the 3D printing kit can include a powder bed material, a fusing agent, and any additional reactive agents (if present) packaged together. In certain examples, the powder bed material can be in the form of a container or bag of loose powder material. In other examples, the powder bed material can be in a cartridge designed to fit in a specific 3D printing system. Similarly, the fusing agent and reactive agents can be in cartridges designed for use with a specific 3D printing system, or the fluids can be in another package such as bottles.

Powder Bed Material

In certain examples, the powder bed material can include polymer particles having a variety of shapes, such as substantially spherical particles or irregularly-shaped particles. In some examples, the polymer powder can be capable of being formed into 3D printed objects with a resolution of about 20 µm to about 100 µm, about 30 µm to about 90 µm, or about 40 µm to about 80 µm. As used herein, "resolution" refers to the size of the smallest feature that can be formed on a 3D printed object. The polymer powder can form layers from about 20 µm to about 100 µm thick, allowing the fused layers of the printed part to have roughly the same thickness. This can provide a resolution in the z-axis (i.e., depth) direction of about 20 µm to about 100 µm. The polymer powder can also have a sufficiently small particle size and sufficiently regular particle shape to provide about 20 µm to about 100 µm resolution along the x-axis and y-axis (i.e., the axes parallel to the top surface of the powder bed). For example, the polymer powder can have an average particle size from about 20 µm to about 100 µm. In other examples, the average particle size can be from about 20 µm to about 50 µm. Other resolutions along these axes can be from about 30 µm to about 90 µm, or from 40 µm to about 80 µm.

The thermoplastic polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be nylon 6 powder, nylon 9 powder, nylon 11 powder, nylon 12 powder, nylon 66 powder, nylon 612 powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate polyether ketone powder, polyacrylate powder, polystyrene powder, or mixtures thereof. In a specific example, the polymer powder can be nylon 12, which can have a melting point from about 175° C. to about 200° C. In another specific example, the polymer powder can be thermoplastic polyurethane.

The thermoplastic polymer particles can also in some cases be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 10:1 to about 1:2 or from about 5:1 to about 1:1.

As mentioned above, in certain examples the polymer powder can include a polymer having multiple amino groups as a part of the polymer itself. Several non-limiting examples of such polymers include polyamides such as nylon 6, nylon 9, nylon 11, nylon 12, nylon 66, and nylon 612. In some examples, polymers that include multiple amino groups can include from about 2 to about 1,000 amino groups per molecule. In further examples, the polymer can be made up of polymerized monomer units, wherein the individual monomer units include an amino group or multiple amino groups per monomer unit. Additionally, all or a portion of the amino groups of the monomer units can be available for reaction with epoxide groups after the monomers have polymerized (i.e., the amino groups of the monomers are not consumed during the polymerization of the monomers). Alternatively, the monomers may not include amino groups before polymerization, but the polymerization reaction may create amino groups on the polymer molecule, wherein the amino groups are available for reaction with epoxide groups.

In further examples, the polymer powder can be premixed with a separate amine compound or an epoxy compound. By using a polymer powder that already includes either an amine compound or an epoxy compound, the 3D printing processes described herein can be carried out without using a separate reactive agent containing whichever amine or epoxy compound is included in the polymer powder. Thus, the process can be simplified by eliminating one of the reactive agents. However, in some cases it may be more efficient to use separate reactive agents including the amine compound and epoxy compound rather than mixing an amine compound or epoxy compound with the polymer powder. The separate reactive agents can be applied selectively in certain areas to form the 3D printed object, which can use less of the amine and epoxy compound than if the entire powder bed is mixed with either the amine or epoxy compound.

In certain examples, the polymer powder can be mixed with an epoxy compound such as 2-ethylhexyl glycidyl ether, phenol glycidyl ether, p-tert-butylphenyl glycidyl ether, dibromo phenyl glycidyl ether, lauryl alcohol glycidyl ether, resorcinol diglycidyl ether, neopentyl glycol diglycidyl ether, 1,6-hexanediol diglycidyl ether, glycerol polyglycidyl ether, trimethylolpropane polyglycidyl ether, pentaerythritol polyglycidyl ether, diglycerol polyglycidyl ether, polyglycerol polyglycidyl ether, sorbitol polyglycidyl ether, diglycidyl terephthalate, diglycidyl o-phthalate, N-glycidyl phthalimide, ethylene glycol diglycidyl ether, polyethylene glycol diglycidyl ether, tris(4-hydroxyphenyl) methane triglycidyl ether, or combinations thereof.

In certain other examples, the polymer powder can be mixed with an amine compound such as aniline sulfonamide, tetraethylenepentamine, dipropylenediamine, diethylaminopropylamine, N-aminoethylpiperazine, bis(2-ethylhexyl)amine, methanediamine methylphenyl diamine, methylphenylenediamine, diaminodiphenyl sulfone, diethylenetriamine, triethylenetetramine, or a combination thereof.

When the powder bed material includes polymer powder mixed with an amine compound or an epoxy compound, the amount of amine or epoxy compound can be from about 0.1 wt % to about 10 wt % of the total weight of the powder bed material.

Methods of Making Three-Dimensional Printed Articles

The present disclosure also extends to methods of making three-dimensional printed articles. These methods can include jetting a fusing agent onto a layer of powder bed material and irradiating the powder bed to selectively fuse the powder bed material where the fusing agent was jetted. As explained above, an epoxy compound and an amine compound can also be introduced into the powder bed material, either by including the epoxy or amine compound in the powder bed material beforehand, including the epoxy or amine compound in the fusing agent, or jetting additional reactive agents including the epoxy or amine compound. The epoxy and amine compound can react to form cross-linking, strengthening the final 3D printed article.

Figure 7:
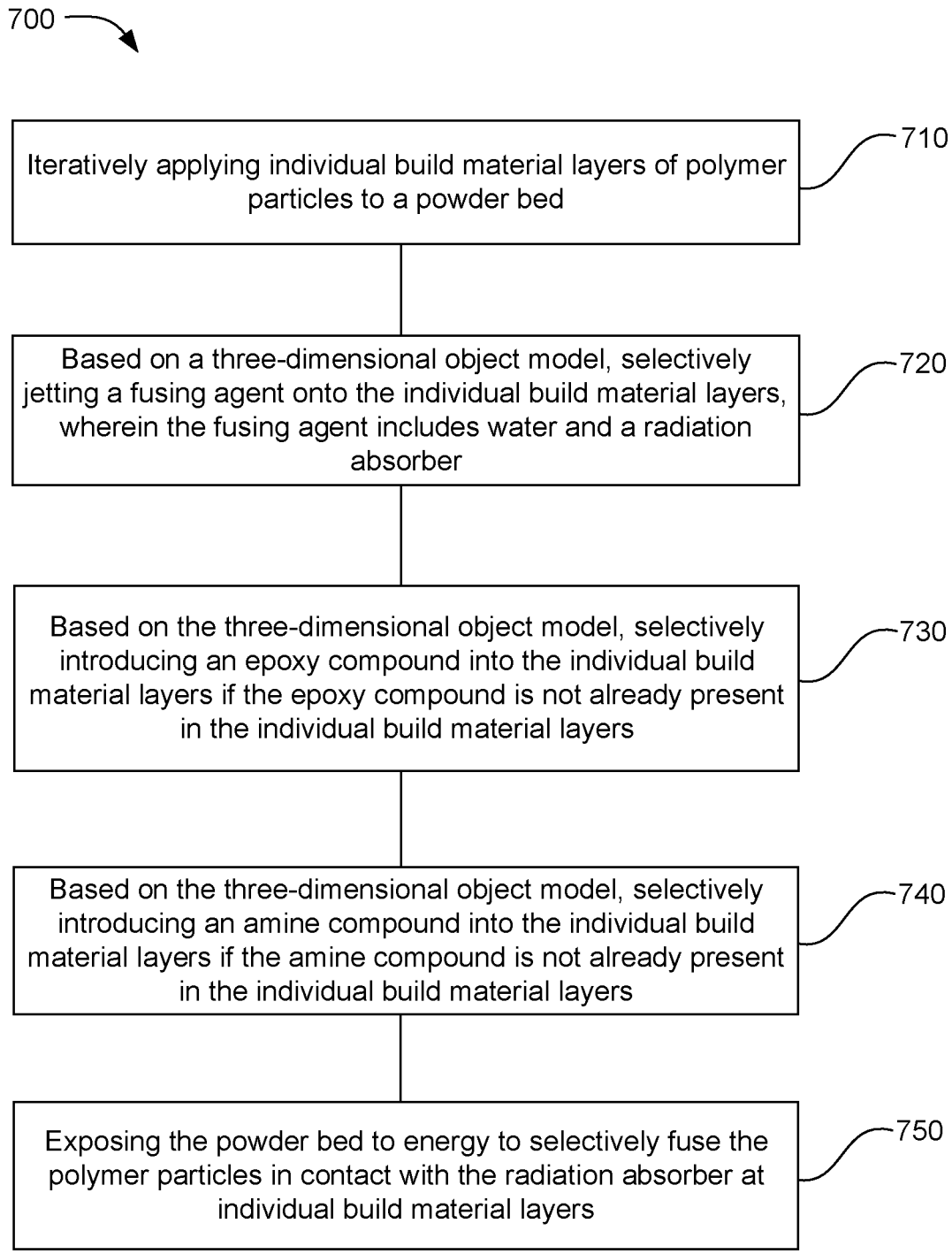
FIG. 7 is a flowchart illustration of an example method of making a three-dimensional printed article in accordance with the present disclosure.

FIG. 7 is a flowchart illustrating an example method 700 of making a three-dimensional printed article. The method includes: iteratively applying individual build material layers of polymer particles to a powder bed 710; based on a three-dimensional object model, selectively jetting a fusing agent onto the individual build material layers, wherein the fusing agent includes water and a radiation absorber 720; based on the three-dimensional object model, selectively introducing an epoxy compound into the individual build material layers if the epoxy compound is not already present in the individual build material layers 730; based on the three-dimensional object model, selectively introducing an amine compound into the individual build material layers if the amine compound is not already present in the individual build material layers 740; and exposing the powder bed to energy to selectively fuse the polymer particles in contact with the radiation absorber at individual build material layers 750.

As mentioned above, the 3D printed article can be formed by jetting a fusing agent onto layers of powder bed build material according to a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article. Other information may also be included, such as structures to be formed of additional different materials or color data for printing the article with various colors at different locations on the article. The 3D object model may also include features or materials specifically related to jetting fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, concentration of epoxy and amine compounds, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the 3D printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A printing head, such as an inkjet print head, can then be used to print a fusing agent including a radiation absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften or melt and fuse together into a formed layer. After the first layer is formed, a new thin layer of polymer powder can be spread over the powder bed and the process can be repeated to form additional layers until a complete 3D article is printed. Thus, "applying individual build material layers of polymer particles to a powder bed" also includes spreading layers of polymer particles over the loose particles and fused layers beneath the new layer of polymer particles.

In some examples, a detailing agent can be used together with the fusing agent. The detailing agent can include a detailing compound that reduces the maximum temperature of the polymer powder on which the detailing agent is printed. In particular, the maximum temperature reached by the powder during exposure to electromagnetic energy can be less in the areas where the detailing agent is applied. In certain examples, the detailing agent can include a solvent that evaporates from the polymer powder to evaporatively cool the polymer powder. The detailing agent can be printed in areas of the powder bed where fusing is not desired. In particular examples, the detailing agent can be printed along the edges of areas where the fusing agent is printed. This can give the fused layer a clean, defined edge where the fused polymer particles end and the adjacent polymer particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the build material), the detailing agent can be applied to these areas.

Figure 8:
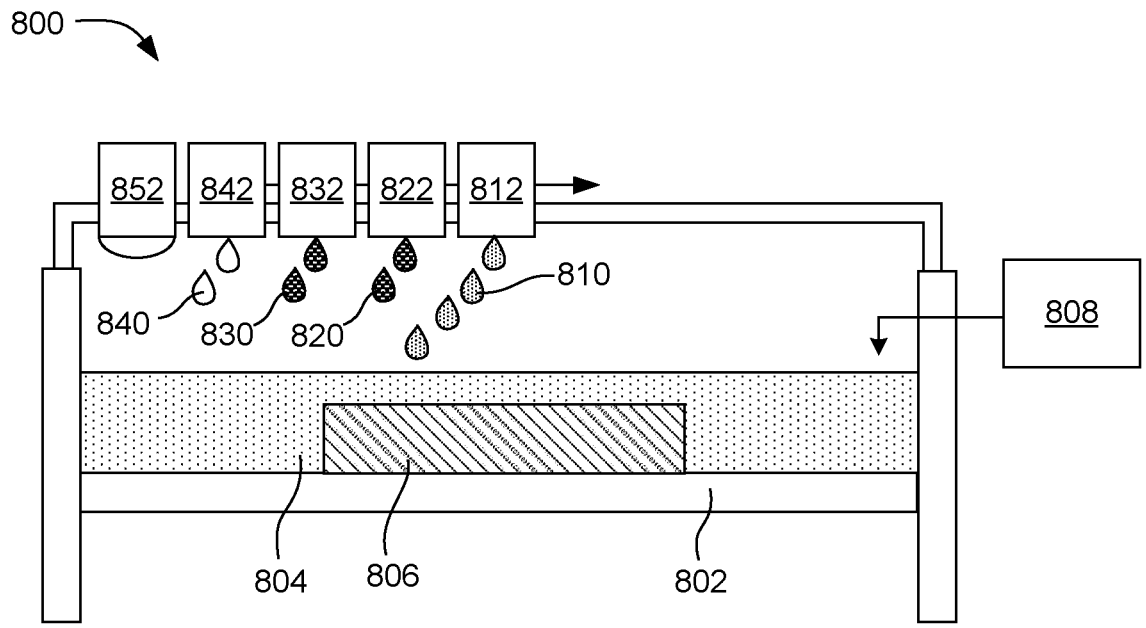
FIG. 8 is a schematic view of a three-dimensional printing system in accordance with the present disclosure.
Figure 9:
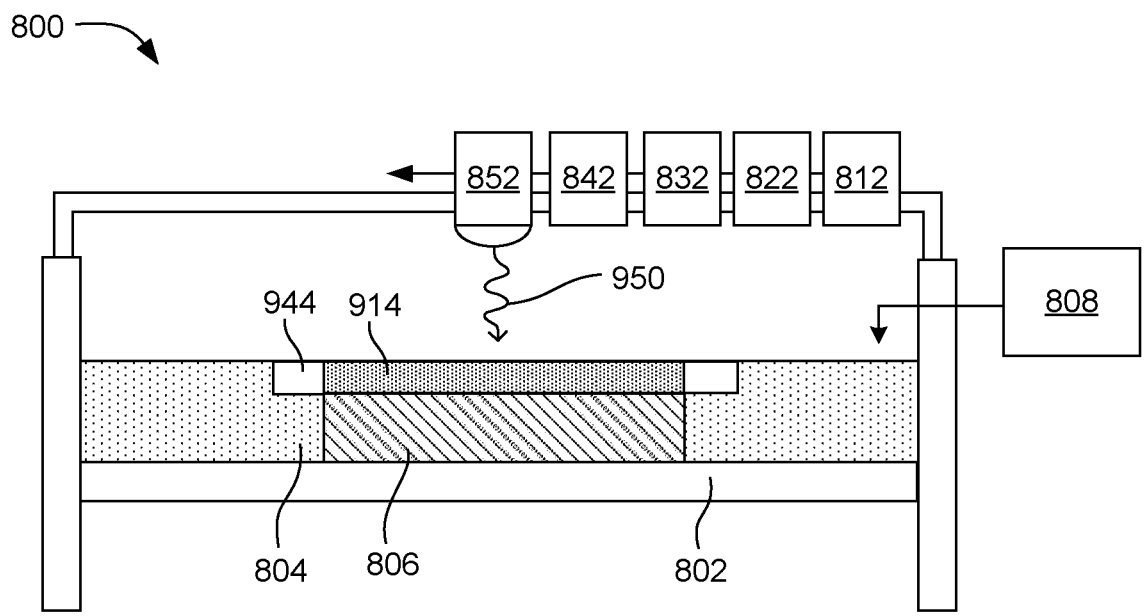
FIG. 9 is another schematic view of a three-dimensional printing system in accordance with the present disclosure.
Figure 10:
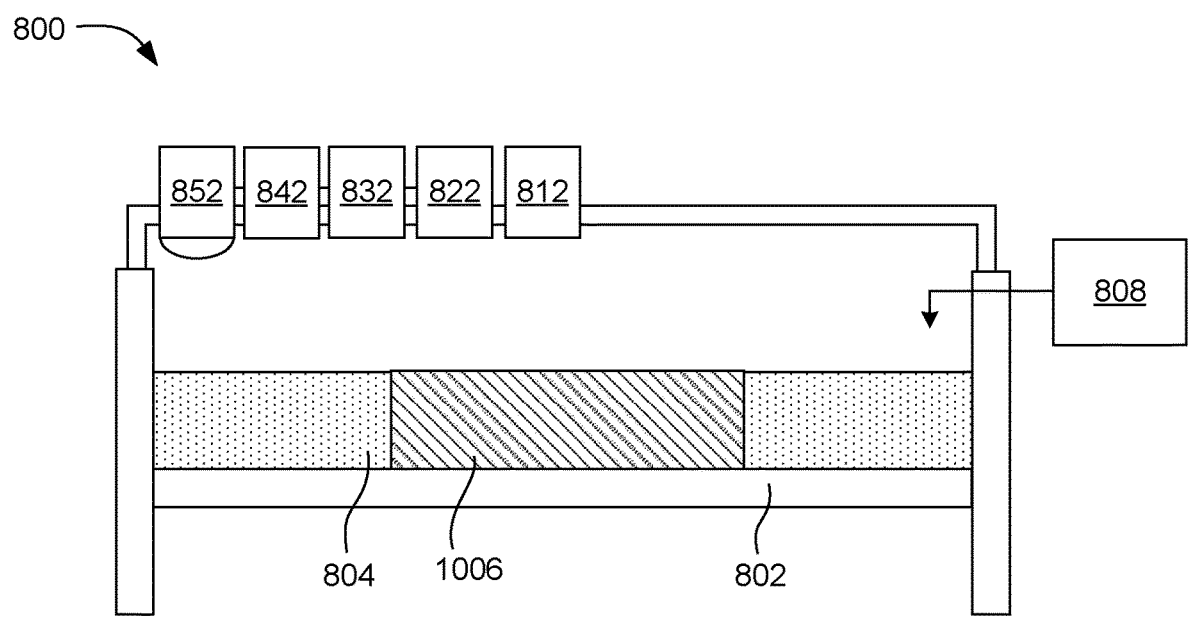
FIG. 10 is another schematic view of a three-dimensional printing system in accordance with the present disclosure.

FIGS. 8-10 illustrate one example method of making a 3D printed article. FIG. 8 shows a 3D printing system 800 that includes a build platform 802 supporting a powder bed of build material powder 804. A partially printed article 806 is made up of fused build material powder in the powder bed. This figure shows a cross-sectional view of the partially printed article and the powder bed. A layer of fresh build material powder is supplied over the top of the partially printed article from a build material supply 808. Fluids are applied to the layer of fresh build material, including fusing agent 810 from a fusing agent jet 812, a first reactive agent 820 from a first reactive agent jet 822, a second reactive agent 830 from a second reactive agent jet 832, and a detailing agent 840 from a detailing agent jet 842. The fluid jets are moveable within the printing system so that the fluid jets can move across the powder bed to apply the fluids in specific, desired locations. The system also includes an electromagnetic energy source 852.

FIG. 9 shows the 3D printing system 800 after the fluids have been jetted onto portions of the build material powder 804. The top layer of build material now includes areas jetted with detailing fluid 944, and areas jetted with the fusing agent and the first and second reactive agents 914. The powder bed can be exposed to electromagnetic energy 950 from an energy source 852, such as an infrared lamp.

FIG. 10 shows the 3D printing system 800 after fusing the top layer to complete a 3D printed article 1006. The 3D printed article can be removed from the powder bed and cleaned to remove loose powder bed material from the article.

As mentioned above, individual layers of the 3D printed article can be formed by fusing the polymer powder build material. A fusing agent can be applied to the polymer powder in areas to be fused, while a detailing agent can be applied to areas to be cooled. 3D printing systems used to perform these printing methods can include an electromagnetic energy source to apply electromagnetic energy to fuse the polymer powder printed with the fusing agent. In some cases, the energy source can be a lamp such as an infrared lamp.

Suitable fusing lamps for use in the 3D printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure used to fuse individually printed layer. The fusing lamp can be configured to irradiate the entire powder bed with a substantially uniform amount of energy. This can selectively fuse the portions printed with the fusible fluid while leaving the unprinted portions of the polymer powder below the fusing temperature.

In one example, the fusing lamp can be matched with the radiation absorber in the fusing agent so that the source emits wavelengths of light that match the peak absorption wavelengths of the radiation absorber. A radiation absorber with a narrow peak at a particular near-infrared wavelength can be used with an electromagnetic radiation fusing source that emits a narrow range of wavelengths at approximately the peak wavelength of the fusing agent. Similarly, a radiation absorber that absorbs a broad range of near-infrared wavelengths can be used with an electromagnetic radiation fusing source that emits a broad range of wavelengths. Matching the radiation absorber and the electromagnetic radiation fusing source in this way can increase the efficiency of fusing the polymer particles with the fusing agent printed thereon, while the unprinted polymer particles do not absorb as much light and remain at a lower temperature.

In some examples, the three-dimensional printing system can also include preheaters for preheating the polymer powder to a temperature near the fusing temperature. In one example, the system can include a print bed heater to heat the print bed during printing. The preheat temperature used can depend on the type of polymer used. In some examples, the print bed heater can heat the print bed to a temperature from about 50° C. to about 250° C. The system can also include a supply bed, where polymer particles can be stored before being spread in a layer onto the print bed. The supply bed can have a supply bed heater. In some examples, the supply bed heater can heat the supply bed to a temperature from about 80° C. to about 140° C.

Depending on the amount of radiation absorber present in the polymer powder, the absorbance of the radiation absorber, the preheat temperature, and the fusing temperature of the polymer, an appropriate amount of irradiation can be supplied from the electromagnetic energy source or fusing lamp. In some examples, the fusing lamp can irradiate individual layers from about 0.1 to about 10 seconds per pass. In further examples, the fusing lamp can move across the powder bed at a rate of about 1 inch per second to about 60 inches per second to fuse the individual layers. In still further examples, the fusing lamp can move across the powder bed at a rate of about 5 inches per second to about 20 inches per second.

In various examples, the fusing agent, first reactive agent (if present), and second reactive agent (if present), can be applied to the powder bed material in any order. In one example, the fusing agent, first reactive agent, and second reactive agent can be applied to the powder bed material before irradiating the powder bed material. In another example, the fusing agent can be applied to the powder bed material first. The powder bed material can then be irradiated to melt the polymer particles that were printed with the fusing agent. After melting the polymer particles, the first reactive agent and second reactive agent can be applied. In a particular example, the powder bed can then be irradiated a second time. The additional heating from irradiating the powder bed a second time can help cure the epoxy and amine compounds.

In further examples, additional heating can help complete the curing reaction between the epoxy compound and the amine compound. In some examples, the completed 3D printed article can be post-cured by heating in an oven or similar heater for a period of time. In one example, the 3D printed article can be post-cured at a temperature from about 100° C. to about 200° C. for a time from about 30 minutes to about 24 hours. This can allow for more reaction between the epoxy and amine compounds to form more crosslinking and strengthen the 3D printed article.

Definitions

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, a plurality of items, structural elements, compositional elements, and/or materials may be presented in a common list for convenience. However, these lists should be construed as though each individual member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, and also to include all the individual numerical values or sub-ranges encompassed within that range as if the numerical value and sub-range is explicitly recited. For example, a weight ratio range of about 1 wt % to about 20 wt % should be interpreted to include the explicitly recited limits of 1 wt % and about 20 wt %, and also to include individual weights such as 2 wt %, 11 wt %, 14 wt %, and sub-ranges such as 10 wt % to 20 wt %, 5 wt % to 15 wt %, etc.

As a further note, in the present disclosure, it is noted that when discussing the fluids, materials, and methods described herein, these discussions can be considered applicable to the various examples, whether or not they are explicitly discussed in the context of that example. Thus, for example, in discussing details about the methods of making 3D printed articles, such discussion also refers to the 3D printing kits, and vice versa.

EXAMPLES

Example 1: PA12 Powder with Carbon Black Fusing Agent

Several samples were formed using an HP Multi Jet Fusion® test bed. The powder bed material was a nylon-12 (polyamide-12 or "PA12") powder with a particle size ranging from about 10 μm to about 100 μm. The samples were formed by fusing together individual layers of polymer particles using a fusing agent that included carbon black pigment as the radiation absorber. A first reactive agent and a second reactive agent were jetted onto the powder bed material after melting the polymer particles. The particular process used for printing was to perform a forward printing pass in which the fusing agent was jetted on the powder bed. A backward pass was then performed in which the fusing lamp of the test bed was activated to heat the powder bed and melt the particles that were printed with the fusing agent. A second forward pass was then performed. In this forward pass, the first reactive agent and the second reactive agent were jetted onto the molten polymer particles. A second backward pass was then performed during which the fusing lamp was activated to heat the powder bed material to help the epoxy and amine compounds react. The overall ratio of the amounts of fusing agent:first reactive agent:second reactive agent was 128:256:340.

The first reactive agent had the following composition:

TABLE 1

| Ingredient Type | Specific Ingredient | Concentration (wt %) |
|---|---|---|
| Epoxy | 1:1 weight ratio of ethyleneglycol diglycidyl ether and triphenylolmethane triglycidyl ether | 20 |
| Humectant | diethylene glycol butyl ether | 40 |
| Liquid Vehicle | ink vehicle including water, humectant, surfactant, biocide, and anti-kogation agent | 40 |

The second reactive agent had the following composition:

TABLE 2

| Ingredient Type | Specific Ingredient | Concentration (wt %) |
|---|---|---|
| Amine | 4,4-diaminodiphenyl sulfone | 15 |
| Humectant | 2-pyrrolidone | 45 |
| Liquid Vehicle | ink vehicle including water, humectant, surfactant, biocide, and anti-kogation agent | 10 |
| Solvent | water | 30 |

Some of the samples were cured for 18 hours at a temperature of 160° C. The following samples were prepared with various combinations of curing, no curing, addition of the reactive agents, and absence of the reactive agents. The samples were then tested using an Instron® tensile testing machine (Illinois Tool Works Inc., Massachusetts), which exposed the samples to normal force acting perpendicular to the cross-sectional area and while measuring the strain (% elongation). The samples exhibited a linear elastic deformation phase followed by a plastic deformation phase before breaking. The modulus was calculated as the slope of the stress/strain curve during the elastic deformation phase. The modulus, maximum stress, and maximum strain are shown in Table 3 below:

TABLE 3

| Sample | Max Tensile Strain (%) | Max Tensile Stress (MPa) | Modulus (MPa) |
|---|---|---|---|
| Pure PA12 | 209.41 | 44.97 | 1351.59 |
| Pure PA12 | 201.41 | 44.17 | 1310.44 |
| PA12, no reactive agents, oven cured | 38.18 | 53.37 | 1847.09 |
| PA12, no reactive agents, oven cured | 42.55 | 52.77 | 1550.68 |
| PA12, with reactive agents, no curing | 52.87 | 49.22 | 1718.24 |
| PA12, with reactive agents, no curing | 43.20 | 48.14 | 1721.86 |
| PA12, with reactive agents, oven cured | 26.06 | 53.26 | 2217.73 |
| PA12, with reactive agents, oven cured | 32.77 | 51.85 | 2452.65 |

The highest modulus was achieved using the reactive agents combined with oven curing. This combination provided a modulus of 2452.65, while pure PA12 had a modulus of 1351.59.

Example 2: PA12 Powder with Metal Dithiolene Fusing Agent

Several samples were prepared similar to Example 1, using PA12 powder as the powder bed material and a metal dithiolene based fusing agent instead of the carbon black fusing agent of Example 1. The first and second reactive agents had the same compositions as in Example 1. A series of samples were prepared with and without the reactive agents. The modulus was then measured as in Example 1. The results are shown in Table 4 below:

TABLE 4

| Sample | Max Tensile Strain (%) | Max Tensile Stress (MPa) | Modulus (MPa) |
|---|---|---|---|
| PA12, with reactive agents, oven cured | 23.38 | 55.63 | 3128.15 |
| PA12, with reactive agents, oven cured | 38.33 | 57.71 | 3271.06 |
| PA12, with reactive agents, oven cured | 40.30 | 54.75 | 2858.14 |
| PA12, no reactive agents, oven cured | 37.56 | 52.44 | 1924.26 |
| PA12, no reactive agents, oven cured | 23.76 | 52.55 | 1751.84 |
| PA12, no reactive agents, oven cured | 55.02 | 52.42 | 1924.26 |

Again, this example showed that the combination of reactive agents with oven curing provided the highest modulus.

Example 3: Glass Filled PA12 with Carbon Black Fusing Agent

Several samples were prepared using a glass bead-filled nylon-12 powder ("PA12 GB") and a carbon black based fusing agent. The modulus was measured as in Examples 1 and 2 above. The results are shown in Table 5 below:

TABLE 5

| Sample | Max Tensile Strain (%) | Max Tensile Stress (MPa) | Modulus (MPa) |
|---|---|---|---|
| Pure PA12 GB | 10.31 | 35.58 | 2857.60 |
| Pure PA12 GB | 19.37 | 33.78 | 2734.30 |
| PA12 GB, with reactive agents, no curing | 26.87 | 29.63 | 1963.18 |
| PA12 GB, with reactive agents, no curing | 35.19 | 28.89 | 2043.31 |
| PA12 GB, with reactive agents, oven curing | 5.69 | 48.05 | 3363.38 |
| PA12 GB, with reactive agents, oven curing | 5.88 | 50.50 | 3250.56 |

Again, the combination of the reactive agents with curing provided the highest modulus.

Example 4: Glass Filled PA12 with Metal Dithiolene Fusing Agent

Several samples were prepared using the glass bead-filled nylon-12 powder and the metal dithiolene based fusing agent. The modulus of the samples was measured as in Examples 1, 2, and 3. The results are shown in Table 6 below:

TABLE 6

| Sample | Max Tensile Strain (%) | Max Tensile Stress (MPa) | Modulus (MPa) |
| --- | --- | --- | --- |
| PA12 GB, with reactive agents, oven curing | 5.33 | 52.46 | 4249.23 |
| PA12 GB, with reactive agents, oven curing | 5.31 | 53.58 | 4485.11 |
| PA12 GB, with reactive agents, oven curing | 4.82 | 45.85 | 3849.95 |
| PA12 GB, no reactive agents, oven curing | 6.98 | 25.89 | 2843.31 |
| PA12 GB, no reactive agents, oven curing | 10.05 | 26.59 | 2734.30 |
| PA12 GB, no reactive agents, oven curing | 5.43 | 15.58 | 2727.69 |

Overall, the examples show that the highest modulus can be achieved using a combination of the first reactive agent including the epoxy compound, the second reactive agent including the amine compound, and curing. The use of glass bead-filled polymer powder and the use of the metal dithiolene-based fusing agent also appear to increase the modulus of the 3D printed article.

What has been described and illustrated herein is an example of the disclosure along with some of its variations. The terms, descriptions, and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A three-dimensional printing kit, comprising:
    a powder bed material comprising polymer particles;
    a fusing agent comprising water and a radiation absorber to selectively apply to the powder bed material;
    an epoxy compound having multiple epoxide groups, wherein the epoxy compound is present in: a) the powder bed material or b) the fusing agent; and
    an amine compound having multiple amino groups, wherein the amine compound is: a) an amino group-containing polymer included in the polymer particles of the powder bed material, b) a non-polymeric amine compound mixed with the polymer particles of the powder bed material, or c) present in the fusing agent, wherein the amine compound and the epoxy compound are not present together in the powder bed material or the fusing agent.

2. The three-dimensional printing kit of claim 1, wherein the polymer particles have an average particle size from about 20 pm to about 100 pm and include nylon 6, nylon 9, nylon 11, nylon 12, nylon 66, nylon 612, polyethylene, thermoplastic polyurethane, polypropylene, polyester, polycarbonate, polyether ketone, polyacrylate, polystyrene powder, wax, or a combination thereof.

3. The three-dimensional printing kit of claim 1, wherein the epoxy compound comprises ethylene glycol diglycidyl ether and tris(4-hydroxyphenyl) methane triglycidyl ether and the amine compound comprises diaminodiphenyl sulfone.

4. The three-dimensional printing kit of claim 1, wherein the radiation absorber is a metal dithiolene complex.

5. The three-dimensional printing kit of claim 1, further comprising a detailing agent comprising a detailing compound to selectively apply to the powder bed material.

6. A method of making a three-dimensional printed article using the three-dimensional printing kit of claim 1, comprising:
    iteratively applying individual build material layers of the powder bed material to a powder bed;
    based on a three-dimensional object model, selectively jetting the fusing agent onto the individual build material layers; and
    exposing the powder bed to energy to selectively fuse the polymer particles in contact with the radiation absorber at individual build material layers.

7. The method of claim 6, further comprising post-curing the three-dimensional article at a temperature from about 100° C. to about 200° C. for a time from about 30 minutes to about 24 hours.

8. The three-dimensional printing kit of claim 1, wherein the epoxy compound is 2-ethylhexyl glycidyl ether, phenol glycidyl ether, p-tert-butylphenyl glycidyl ether, dibromo phenyl glycidyl ether, lauryl alcohol glycidyl ether, resorcinol diglycidyl ether, neopentyl glycol diglycidyl ether, 1,6-hexanediol diglycidyl ether, glycerol polyglycidyl ether, trimethylolpropane polyglycidyl ether, pentaerythritol polyglycidyl ether, diglycerol polyglycidyl ether, polyglycerol polyglycidyl ether, sorbitol polyglycidyl ether, diglycidyl terephthalate, diglycidyl o-phthalate, N-glycidyl phthalimide, ethylene glycol diglycidyl ether, polyethylene glycol diglycidyl ether, tris(4-hydroxyphenyl) methane triglycidyl ether, or a combination thereof.

9. The three-dimensional printing kit of claim 1, wherein the amine compound is aniline sulfonamide, tetraethylenepentamine, diethylaminopropylamine, N-aminoethylpiperazine, bis(2-ethylhexyl)amine, methanediamine, methylphenyl diamine, methylphenylenediamine, diaminodiphenyl sulfone, diethylenetriamine, triethylenetetramine, or a combination thereof.

10. The three-dimensional printing kit of claim 1, wherein:
    the epoxy compound is present in the powder bed material in an amount from about 0.1 wt % to about 10 wt % of a total weight of the powder bed material; and
    the amine compound is present in the fusing agent.

11. The three-dimensional printing kit of claim 1, wherein:
    the epoxy compound is present in the fusing agent;
    the amine compound is the non-polymeric amine compound mixed with the polymer particles of the powder bed material; and
    the amine compound is present in the powder bed material in an amount from about 0.1 wt % to about 10 wt % of a total weight of the powder bed material.

* * * * *